(12) United States Patent
Gao et al.

(10) Patent No.: US 12,308,448 B2
(45) Date of Patent: May 20, 2025

(54) BATTERY CELL ENCLOSURE WITH ANTI-GRAVITY ELECTROLYTE DISTRIBUTION

(71) Applicant: GM GLOBAL TECHNOLOGY OPERATIONS LLC, Detroit, MI (US)

(72) Inventors: Jing Gao, Rochester, MI (US); Brian J. Koch, Berkley, MI (US); Yanyan Zhang, Troy, MI (US); Zhe Li, Rochester, MI (US); Daniel J. Wilson, Linden, MI (US); Xingcheng Xiao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 560 days.

(21) Appl. No.: 17/835,344

(22) Filed: Jun. 8, 2022

(65) Prior Publication Data

US 2023/0402687 A1    Dec. 14, 2023

(51) Int. Cl.
*H01M 50/131*    (2021.01)
*H01M 50/116*    (2021.01)

(52) U.S. Cl.
CPC ....... *H01M 50/131* (2021.01); *H01M 50/116* (2021.01)

(58) Field of Classification Search
None
See application file for complete search history.

(56) References Cited

U.S. PATENT DOCUMENTS

| | | | |
|---|---|---|---|
| 2007/0166513 A1* | 7/2007 | Sheng | C09D 139/00 428/141 |
| 2011/0294021 A1* | 12/2011 | Suto | H01M 12/06 429/535 |
| 2020/0365953 A1* | 11/2020 | Pham | H01M 4/248 |

OTHER PUBLICATIONS

Huang et al. [Fabrication of high wettability gradient on copper substrate, Applied Surface Science 280 (2013) 25-32] (Year: 2013).*
Schutzius et al. [Superhydrophobic-superhydrophilic binary micropatterns by localized thermal treatment of polyhedral oligomeric silsesquioxane silica films, Nanoscale 4 (2012) 5378-5385] (Year: 2012).*

* cited by examiner

*Primary Examiner* — Miriam Stagg
*Assistant Examiner* — M. T. Leonard
(74) *Attorney, Agent, or Firm* — Quinn IP Law

(57) ABSTRACT

A battery cell includes an anode, a cathode, a liquid electrolyte, and a battery cell case. The battery cell case is configured to house the anode, the cathode, and the liquid electrolyte and includes a case interior wall arranged proximate one of the anode and the cathode, a battery case ceiling, and a battery case floor catching and collecting the liquid electrolyte due to force of gravity. The case interior wall defines a pattern of surface tension varying between hydrophobic and hydrophilic along the case interior wall between the battery case floor and the battery cell ceiling. The pattern of surface tension thereby facilitates self-propulsion of the liquid electrolyte in opposition to the force of gravity and a predetermined distribution of the liquid electrolyte along the battery cell wall.

20 Claims, 4 Drawing Sheets

BATTERY CELL ENCLOSURE WITH ANTI-GRAVITY ELECTROLYTE DISTRIBUTION

INTRODUCTION

The present disclosure relates to a battery cell enclosure with anti-gravity electrolyte distribution.

High-energy density, electrochemical cells, such as lithium-ion batteries may be used in a variety of consumer products and vehicles, such as Hybrid Electric Vehicles (HEVs) and Electric Vehicles (EVs). Typical lithium-ion, lithium sulfur, and lithium-lithium symmetrical batteries include a first electrode, a second electrode, an electrolyte material, and a separator. One electrode serves as a positive electrode or cathode and another serves as a negative electrode or anode. A stack of battery cells may be housed in an enclosure and be electrically connected to increase overall output.

For example, rechargeable lithium-ion batteries operate by reversibly passing lithium-ions back and forth between the negative electrode and the positive electrode. A separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery.

Particular chemistries of rechargeable batteries, such as the lithium-ion cells, as well as external factors, may cause internal reaction rates generating significant amounts of thermal energy. Such chemical reactions may cause more heat to be generated by the batteries than is effectively withdrawn. In batteries using liquid electrolyte, effective electrolyte distribution/dispersion and coverage of cell electrodes thereby is key to maintaining the battery's performance and temperature within practical limits under various operating conditions.

SUMMARY

A battery cell includes an anode, a cathode, a liquid electrolyte, and a battery cell case. The battery cell case is configured to house the anode, the cathode, and the liquid electrolyte and includes a case interior wall arranged proximate one of the anode and the cathode, a battery case ceiling, and a battery case floor catching and collecting the liquid electrolyte due to force of gravity. The case interior wall defines a pattern of surface tension varying between hydrophobic and hydrophilic along the case interior wall between the battery case floor and the battery cell ceiling. The pattern of surface tension thereby facilitates self-propulsion of the liquid electrolyte in opposition to the force of gravity and a predetermined distribution of the liquid electrolyte along the battery cell wall.

The pattern of surface tension may have a wettability gradient progressing from hydrophobic to hydrophilic up the case interior wall to thereby transfer the liquid electrolyte from the battery case floor up the battery case interior wall in opposition to the force of gravity.

The wettability gradient may be a function of a contact angle $\theta$ of the liquid electrolyte at an interface between the liquid electrolyte and the case interior wall. In such an embodiment, the contact angle $\theta$ includes a contact angle $\theta_A$ of the liquid electrolyte at a location proximate the battery case floor and a contact angle $\theta_B$ of the liquid electrolyte at a location proximate the battery case ceiling according to an expression $\theta_B = \theta_A - \int_0^H (d*dh)$. In the subject expression, H is defined as a height of the case interior wall and d is defined as the wettability gradient.

The wettability gradient may be greater than 3 degrees/mm.

The contact angle $\theta_A$ of the liquid electrolyte proximate the battery case floor may be comparatively greater than the contact angle $\theta_B$ of the liquid electrolyte proximate the battery case ceiling.

The liquid electrolyte contact angle closest to the battery case floor may be greater than 120 degrees.

An air gap may be arranged between the battery case interior wall and one of the anode and the cathode and the wettability gradient may be configured to gradually fill or bridge the air gap up the case interior wall.

The case interior wall may be characterized by a variable surface texture configured to generate the wettability gradient.

The variable surface texture may establish an increasing progression of surface roughness up the case wall and the surface roughness may establish a progression of the wettability gradient from hydrophobic to hydrophilic along the case wall.

The case interior wall may be constructed from a mesoporous material having the surface roughness. Such mesoporous material may be selected from at least one of porous silica, porous alumina, and lithiated zeolite.

The case interior wall may include a surface coating configured to generate the wettability gradient.

A motor vehicle having a power-source and the above-disclosed battery cell structure configured to supply electric energy to the power-source is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above," "below," "upward," "downward," "top," "bottom,", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
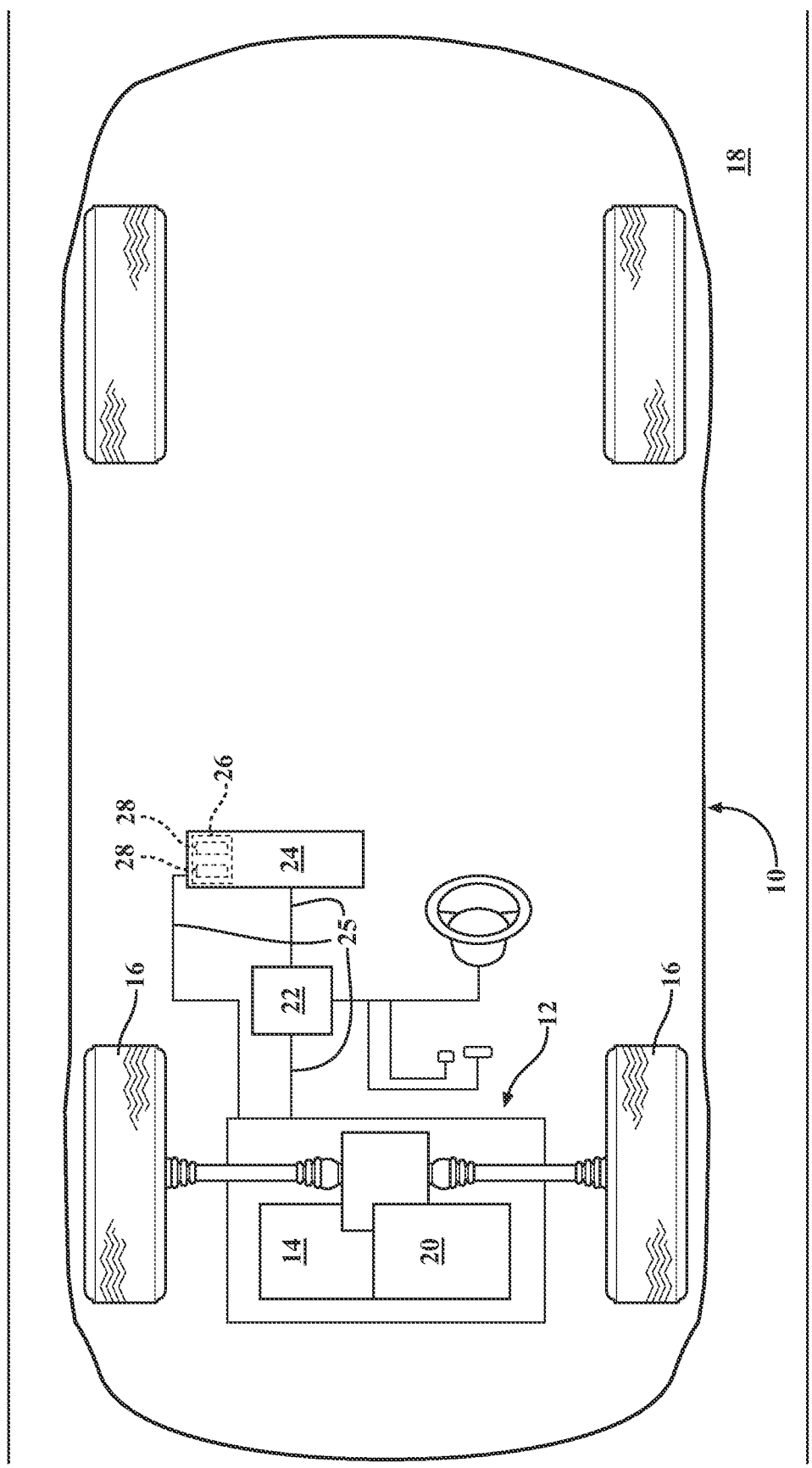
FIG. 1 is a schematic top view of an embodiment of a motor vehicle employing multiple power-sources and a battery system having a battery module with a plurality of battery cells configured to generate and store electrical energy, according to the disclosure.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque T (shown in FIG. 1) for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes an electronic controller 22 and a battery system 24 configured to generate and store electrical energy through heat-producing electro-chemical reactions for supplying the electrical energy to the power-sources 14 and 20. The electronic controller 22 may be a central processing unit (CPU) that regulates various functions on the vehicle 10, or as a powertrain control module (PCM) configured to control the powertrain 12 and the battery system 24 to generate a predetermined amount of power-source torque T.

Figure 2:
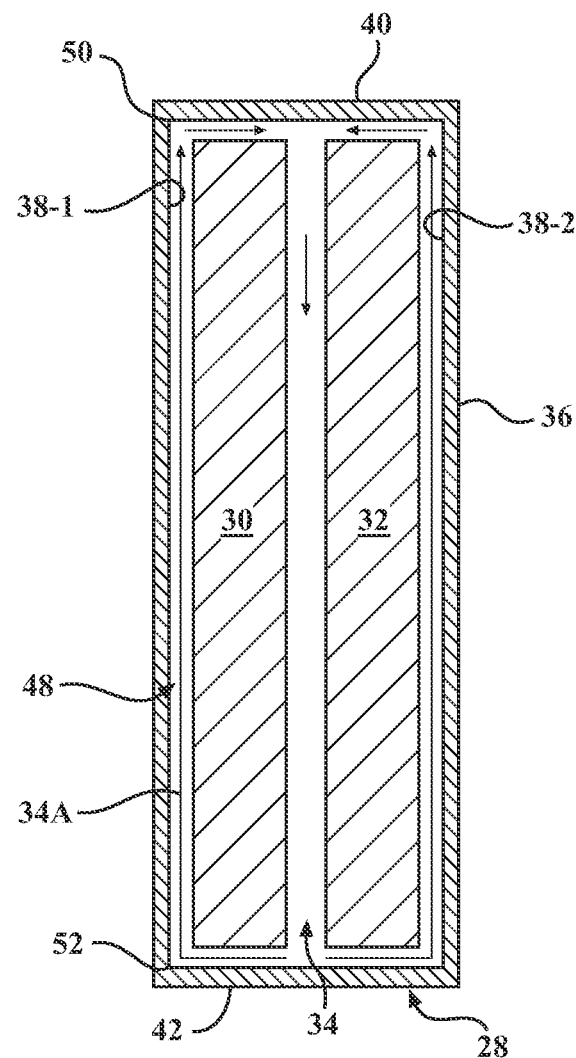
FIG. 2 is a schematic close-up cross-sectional plan view of the battery cell shown in FIG. 1, having an anode, a cathode, a liquid electrolyte heat sink, and a battery case housing, and a general representation of a liquid electrolyte self-propulsion as a result of a pattern of surface tension and wettability gradient defined by the case interior walls, according to the disclosure.

The battery system 24 may be connected to the power-sources 14 and 20, the electronic controller 22, as well as other vehicle systems via a high-voltage BUS 25. As shown in FIGS. 2-5, the battery system 24 may include one or more sections, such as battery arrays or modules 26. A generalized battery module 26 is shown in FIG. 2 as having a plurality of battery cells 28. Although one module 26 and two battery cells 28 are shown in FIGS. 1 and 2, nothing precludes the battery system 24 from having a greater number of such modules and battery cells. As shown in FIG. 2, each battery cell 28 includes a negative electrode or anode 30 and a positive electrode or cathode 32. The anode 30 and the cathode 32 are immersed in a liquid electrolyte 34 formulated to conduct ions as the battery cell 28 discharges, and also when the battery charges (such as in an exemplary case of a Lithium ion (Li-ion) rechargeable battery.

Each battery cell 28 also includes a battery cell case or housing 36. The battery cell case 36 is hermetically sealed and configured to house the anode 30, the cathode 32, and the liquid electrolyte 34. The battery cell case 36 includes a left-side case interior wall 38-1 arranged proximate the anode 30 and a right-side case interior wall 38-2 arranged proximate the cathode 32. The battery cell case 36 also includes a battery case ceiling 40 configured to cover the anode 30, the cathode 32, and the liquid electrolyte 34, and a battery case floor 42 for catching and collecting the liquid electrolyte due to force of gravity. The placement of the anode 30 and the cathode 32 near the respective case interior walls 38-1, 38-2 maintains a corresponding space or gap along the anode and the cathode, to be described in greater detail below, for the liquid electrolyte 34.

Each of the case interior walls 38-1, 38-2 defines a pattern 46 of surface tension (shown in in FIG. 4) varying between hydrophobic and hydrophilic along the corresponding case interior wall of the battery cell 28, between the battery case floor 42 and the battery case ceiling 40. The pattern 46 of surface tension is configured to facilitate self-propulsion 34A (shown in FIG. 2) of the liquid electrolyte 34 in opposition to the force of gravity along the interior wall 38-1, 38-2 and achieve a predetermined distribution of the liquid electrolyte along the battery cell wall. The pattern 46 of surface tension is additionally intended to maintain immersion and coverage of the anode 30 and the cathode 32 in the liquid electrolyte 34 and thereby also aid in dissipation of thermal energy within the battery cell 28. The self-propulsion 34A of the liquid electrolyte 34 may facilitate circulation of the electrolyte around the electrodes 30, 32 and the force of gravity may eventually return the liquid electrolyte to the floor 42, such as by permitting the electrolyte to flow downward between the electrodes.

Generally, the term "surface tension" describes the tendency of liquid surfaces at rest to shrink into a minimum possible surface area, generally in the form of beads or droplets. Surface tension allows objects with a higher density than the liquid to float on the liquid surface without becoming even partly submerged. At an interface of a liquid and another medium, such as air or a solid object, surface tension results from the attraction of liquid molecules to each other (due to cohesion) being greater than to the molecules in the other medium (due to adhesion). An inward force on the surface molecules causes the liquid to contract, while a tangential force acts parallel to the surface of the liquid at the interface of the liquid and the other medium. In mathematical terms, the subject tangential force defines surface tension of the specific interface of the liquid and the other medium, such as the liquid-solid interface. Due to the cohesive forces, a liquid molecule located away from the surface is pulled equally in every direction by neighboring liquid molecules, resulting in a net force of zero.

The pattern 46 of surface tension may have a wettability gradient d progressing from hydrophobic to hydrophilic up the case interior wall 38-1, 38-2. Such progression of the wettability gradient d is intended to transfer the liquid electrolyte 34 from the battery case floor 42 up the battery case interior wall 38-1, 38-2 in opposition to the force of gravity and thereby facilitate uniform distribution of the liquid electrolyte within the battery cell 28. As shown in FIG. 2, an air gap 48 is arranged between the battery case interior wall 38-1, 38-2 and either the anode 30 or the cathode 32. The wettability gradient d is configured to gradually fill or bridge the air gap 48 up the case interior wall 38-1, 38-2 from the battery case floor 42 to the battery case ceiling 40. The wettability gradient d or its progression may be defined relative to a contact angle at the interface between the liquid electrolyte 34 and the case interior wall 38-1, 38-2.

Figure 3:
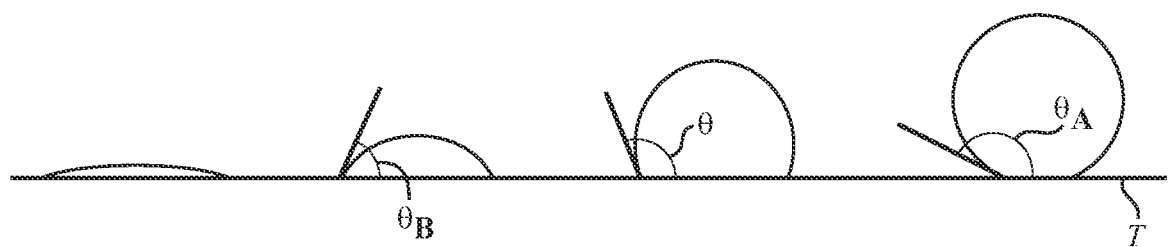
FIG. 3 is a schematic depiction of the wettability gradient ranging from hydrophilic to hydrophobic being correlated to a surface contact angle $\theta$ established by the pattern of surface tension in the battery case housing shown in FIG. 2.

As noted above, the surface of a liquid generally interfaces with some other medium or object. Therefore, surface tension is not a property of the liquid alone, but a property of the liquid's interface with another medium. When a liquid is in a container, such as the battery cell case 36, besides the liquid-air interface at the top liquid surface, there is also an interface between the liquid and a solid, such as the case wall. The surface tension between the liquid and air is usually smaller than the surface tension between the liquid and the walls of a container. Where the two surfaces of the liquid meet (at the liquid-air interface and at the liquid-container wall interface), their geometry is such that all forces (including the forces at the container wall-air interface) balance. Specifically, where the two surfaces meet, they form a contact angle θ, and in the present disclosure, it is the angle the tangent T to the leading surface of the liquid makes with respect to the case interior wall 38-1, 38-2 surface, as shown in FIG. 3.

Figure 5A:
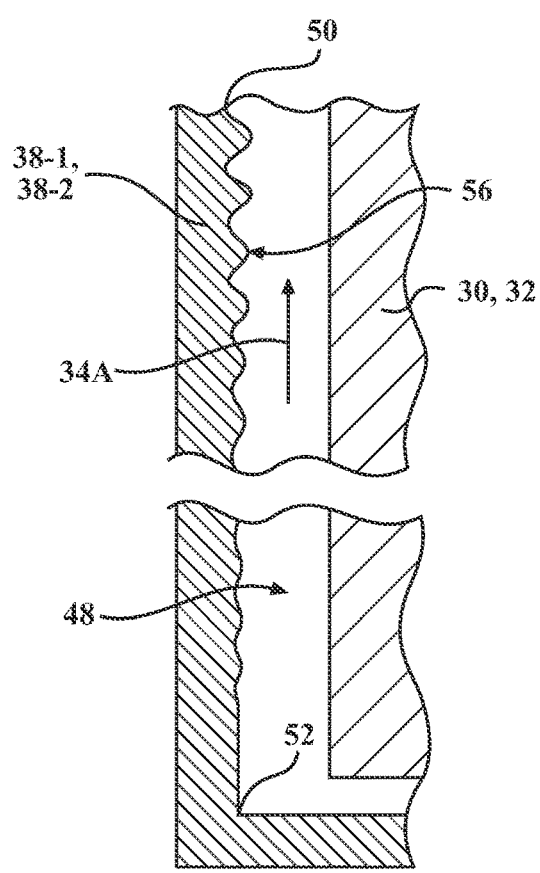
FIG. 5A is a schematic close-up cross-sectional partial plan view of the battery case housing wall shown in FIG. 2, specifically illustrating a battery cell case interior wall having a surface roughness establishing a desired wettability gradient, according to the disclosure.
Figure 5B:
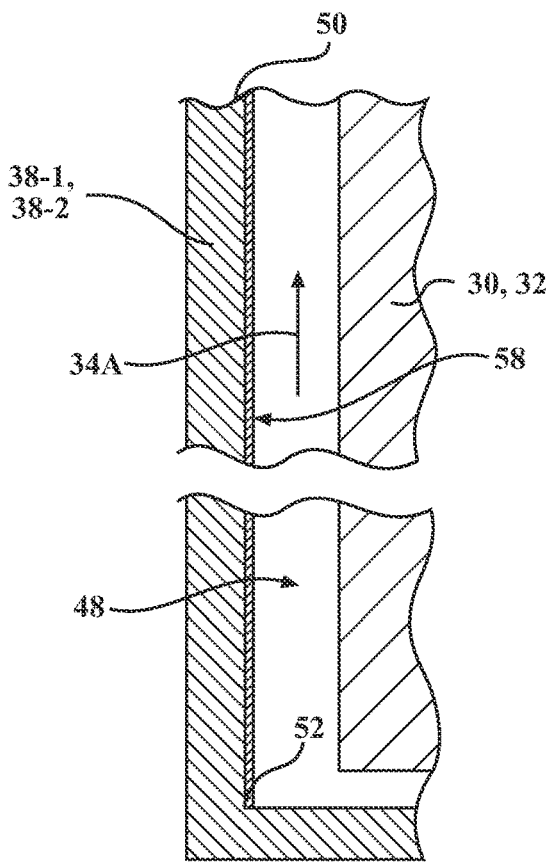
FIG. 5B is a schematic close-up cross-sectional partial plan view of the battery case housing wall shown in FIG. 2, specifically illustrating a battery cell case interior wall having a coating establishing a desired wettability gradient, according to the disclosure.

To implement the wettability gradient d establishing a desired pattern 46 of surface tension the contact angle θ may have a different value at the interface between the liquid electrolyte 34 and the case interior wall 38-1, 38-2 at a location 50, shown in FIGS. 2 and 5, closer to the battery case ceiling 40 versus a location 52 closer to the battery case floor 42, also shown in FIGS. 2 and 5. As shown in FIG. 2, the subject contact angle θ at the location 52 is herein identified as contact angle $\theta_A$ (shown in FIG. 3), while the contact angle θ at the location 50 is identified as contact angle $\theta_B$ (shown in FIG. 3). Specifically, the liquid electrolyte contact angle $\theta_A$ closest to the battery case floor 42 may be greater than 120 degrees, while the liquid electrolyte contact angle $\theta_B$ closest to the battery case ceiling 40 may be less than 90 degrees.

Relationship between the liquid electrolyte contact angle $\theta_A$ and the liquid electrolyte contact angle $\theta_B$ may be defined in terms of the wettability gradient d according to an expression $\theta_B = \theta_A - \int_0^H (d*dh)$, wherein H is defined as a height of the particular case interior wall 38-1 or 38-2. The liquid electrolyte contact angle $\theta_A$ may be specifically defined as a relatively highest liquid electrolyte contact angle generated at the case interior wall 38-1, 38-2 closer to the battery case floor 42. By comparison, the liquid electrolyte contact angle $\theta_B$ may be defined as a relatively lowest liquid electrolyte contact angle generated at the case interior wall 38-1, 38-2 closer to the battery case ceiling 40. Accordingly, the contact angle $\theta_B$ of the liquid electrolyte 34 proximate the battery case ceiling 40 may be comparatively smaller than the contact angle $\theta_A$ of the liquid electrolyte proximate the battery case floor 42.

Figure 4:
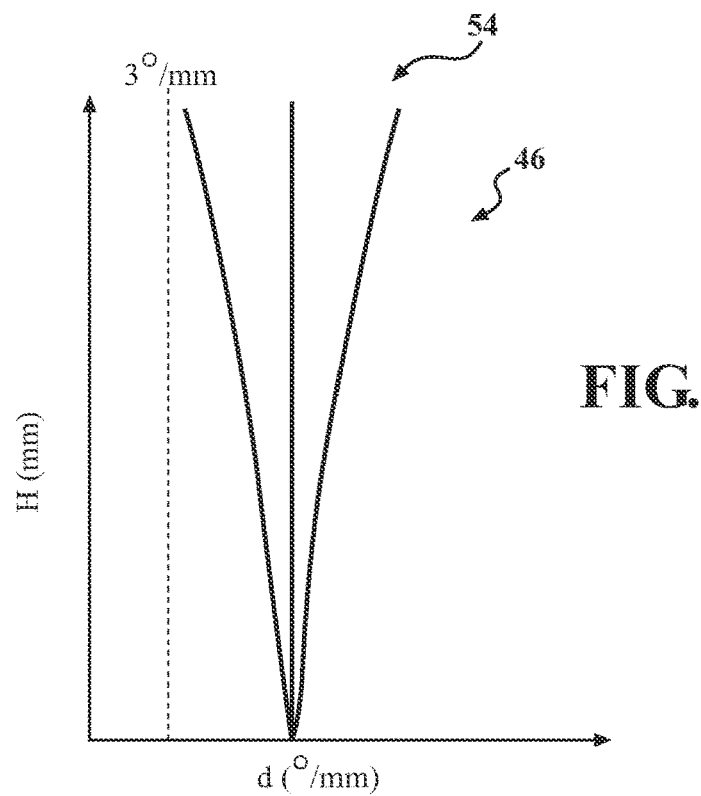
FIG. 4 is a representative plot of the wettability gradient versus the battery case housing wall height, according to the disclosure.

The wettability gradient d may be represented via a data plot 54 shown in FIG. 4. Specifically, as depicted in FIG. 4, the wettability gradient d may be greater than 3 degrees/mm along the particular case interior wall 38-1, 38-2 to achieve a desired transfer of the liquid electrolyte 34 from the battery case floor 42 up to the battery case ceiling 40. The case interior wall 38-1, 38-2 may be characterized by a variable surface texture configured to generate the wettability gradient d. The subject variable surface texture may establish an increasing progression of surface roughness 56 (shown in FIG. up the case wall 38-1, 38-2. Therefore, the surface roughness 56 of the case interior wall 38-1, 38-2 may establish a progression of the wettability gradient d from hydrophobic to hydrophilic along the subject case wall.

A manufacturing process, such as machining of the case interior walls 38-1, 38-2, may define the surface roughness 56 and the corresponding wettability gradient d. The material of the battery cell case 36 may itself establish the surface roughness 56 of the case interior wall 38-1, 38-2. Specifically, the case interior wall 38-1, 38-2 may be constructed from a mesoporous material-containing pores with diameters generally in a range of 2-50 nm—having the surface roughness. The surface roughness 56 may exceed Ra of 0.51 μm. The mesoporous material of the battery cell case 36 may be selected from at least one of porous silica, porous alumina, and lithiated zeolite. Alternatively, the interior case interior wall 38-1, 38-2 may include a surface coating 58 (shown in FIG. configured to generate the targeted wettability gradient d.

Figure 6:
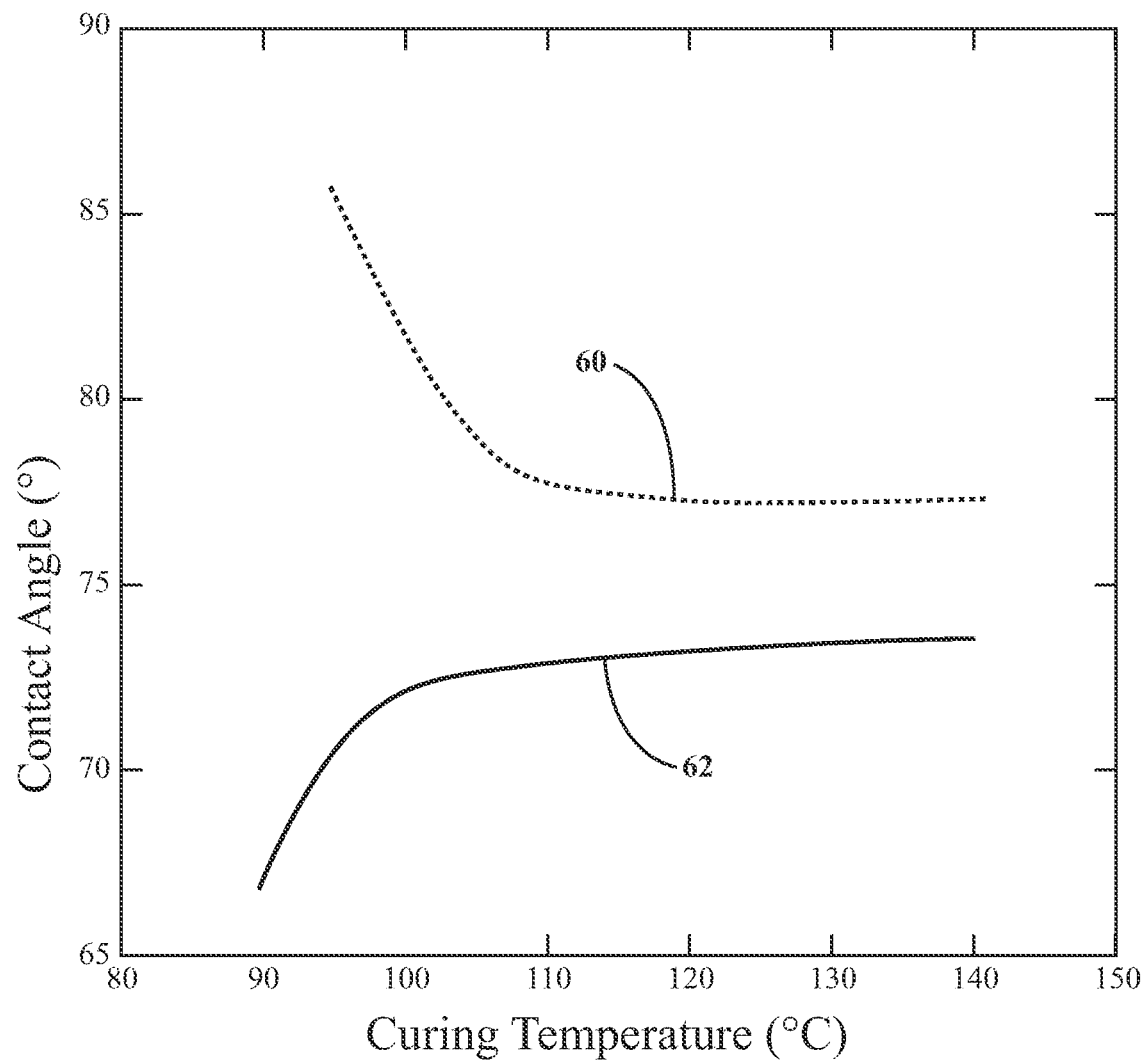
FIG. 6 is a representative plot of curing temperature for two types of polymer materials used to construct a case interior wall versus the case wall surface contact angle θ, according to the disclosure.

The case interior walls 38-1, 38-2 may be constructed from a polymeric material 60 or 62. In such an embodiment, the wettability gradient d of the case interior walls 38-1, 38-2 may be regulated by controlling the curing temperature of the case wall polymeric material when preparing the subject surfaces. FIG. 6 shows a representative plot of the case interior wall surface contact angle θ versus the curing temperature for representative polymer materials 60 or 62 used to construct the case interior wall(s) 38-1, 38-2. Specifically, the liquid electrolyte 34 contact angle θ at the battery cell case 36 interior wall surface may vary with the case material being cured progressively at different temperatures from the location 50, closer to the battery case ceiling 40, to the location 52, closer to the battery case floor 42. Therefore, curing the battery cell case 36 material differently along the wall height H may be used to define the wettability gradient d. Additionally, depending on the material selected, an increase in the curing temperature may either decrease (for the material 60) or increase (for the material 62) the electrolyte contact angle θ at a particular region of the case interior wall 38-1 or 38-2, and thus establish the desired wettability gradient d.

Overall, the pattern 46 of surface tension, such as including the wettability gradient d, is configured to vary between hydrophobic and hydrophilic along the case interior wall of the battery cell 28. The pattern 46 of surface tension is configured to maintain immersion of the battery cell electrodes in the liquid electrolyte 34 via self-propulsion 34A of the liquid electrolyte and promote dissipation of thermal energy within the battery cell 28. Thus, in addition to aiding operating efficiency of the battery cell 28, the pattern 46 of surface tension may be effective in mitigating propagation of a thermal runaway within the battery module 26 between individual battery cells 28, and, therefore, aid operation of the battery module's cooling system.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A battery cell comprising:
    an anode;
    a cathode;
    a liquid electrolyte; and
    a battery cell case configured to house the anode, the cathode, and the liquid electrolyte and having a case interior wall arranged proximate one of the anode and the cathode, a battery case ceiling, and a battery case floor catching and collecting the liquid electrolyte due to force of gravity;
    wherein the case interior wall defines a pattern of surface tension varying between hydrophobic and hydrophilic along the case interior wall between the battery case floor and the battery case ceiling to thereby facilitate self-propulsion of the liquid electrolyte in opposition to the force of gravity and a predetermined distribution of the liquid electrolyte along the case interior wall.

2. The battery cell of claim 1, wherein the pattern of surface tension has a wettability gradient progressing from hydrophobic to hydrophilic up the case interior wall to thereby transfer the liquid electrolyte from the battery case floor up the case interior wall in opposition to the force of gravity.

3. The battery cell of claim 2, wherein the wettability gradient is a function of a contact angle $\theta$ of the liquid electrolyte at an interface between the liquid electrolyte and the case interior wall, and wherein the contact angle $\theta$ includes a contact angle $\theta_B$ of the liquid electrolyte at a location proximate the battery case ceiling and a contact angle $\theta_A$ of the liquid electrolyte at a location proximate the battery case floor according to an expression $\theta_B = \theta_A - \int_0^H (d*dh)$, and wherein H is defined as a height of the case interior wall and d is defined as the wettability gradient.

4. The battery cell of claim 3, wherein the wettability gradient is greater than 3 degrees/mm along the case interior wall.

5. The battery cell of claim 3, wherein the contact angle $\theta_A$ of the liquid electrolyte proximate the battery case floor is comparatively greater than the contact angle $\theta_B$ of the liquid electrolyte proximate the battery case ceiling.

6. The battery cell of claim 5, wherein the liquid electrolyte contact angle closest to the battery case floor is greater than 120 degrees.

7. The battery cell of claim 2, wherein the case interior wall is characterized by a variable surface texture configured to generate the wettability gradient.

8. The battery cell of claim 7, wherein the variable surface texture establishes an increasing progression of surface roughness up the case interior wall and the surface roughness establishes a progression of the wettability gradient from hydrophobic to hydrophilic along the case wall.

9. The battery cell of claim 8, wherein the case interior wall is constructed from a mesoporous material having the surface roughness.

10. The battery cell of claim 2, wherein the case interior wall includes a surface coating configured to generate the wettability gradient.

11. A motor vehicle comprising:
    a power-source configured to generate power-source torque; and
    a battery cell configured to supply electrical energy to the power-source, the battery cell including:
        an anode;
        a cathode;
        a liquid electrolyte; and
        a battery cell case configured to house the anode, the cathode, and the liquid electrolyte and having a case interior wall arranged proximate one of the anode and the cathode, a battery case ceiling, and a battery case floor catching and collecting the liquid electrolyte due to force of gravity;
        wherein the case interior wall defines a pattern of surface tension varying between hydrophobic and hydrophilic along the case interior wall between the battery case floor and the battery case ceiling to thereby facilitate self-propulsion of the liquid electrolyte in opposition to the force of gravity and a predetermined distribution of the liquid electrolyte along the case interior wall.

12. The motor vehicle of claim 11, wherein the pattern of surface tension has a wettability gradient progressing from hydrophobic to hydrophilic up the case interior wall to thereby transfer the liquid electrolyte from the battery case floor up the case interior wall in opposition to the force of gravity.

13. The motor vehicle of claim 12, wherein the wettability gradient is a function of a contact angle $\theta$ of the liquid electrolyte at an interface between the liquid electrolyte and the case interior wall, and wherein the contact angle $\theta$ includes a contact angle $\theta_B$ of the liquid electrolyte at a location proximate the battery case ceiling and a contact angle $\theta_A$ of the liquid electrolyte at a location proximate the battery case floor according to an expression $\theta_B = \theta_A - \int_0^H (d*dh)$, and wherein H is defined as a height of the case interior wall and d is defined as the wettability gradient.

14. The motor vehicle of claim 13, wherein the contact angle $\theta_A$ of the liquid electrolyte proximate the battery case floor is comparatively greater than the contact angle $\theta_B$ of the liquid electrolyte proximate the battery case ceiling.

15. The motor vehicle of claim 14, wherein the liquid electrolyte contact angle closest to the battery case floor is greater than 120 degrees.

16. The motor vehicle of claim 12, wherein the case interior wall is characterized by a variable surface texture configured to generate the wettability gradient.

17. The motor vehicle of claim 16, wherein the variable surface texture establishes an increasing progression of surface roughness up the case interior wall and the surface roughness establishes a progression of the wettability gradient from hydrophobic to hydrophilic along the case wall.

18. The motor vehicle of claim 17, wherein the case interior wall is constructed from a mesoporous material having the surface roughness.

19. The motor vehicle of claim 12, wherein the case interior wall includes a surface coating configured to generate the wettability gradient.

20. A battery cell comprising:
    an anode;
    a cathode;
    a liquid electrolyte; and
    a battery cell case configured to house the anode, the cathode, and the liquid electrolyte and having a case interior wall arranged proximate one of the anode and the cathode, a battery case ceiling, and a battery case floor catching and collecting the liquid electrolyte due to force of gravity;
    wherein:
        the case interior wall defines a pattern of surface tension varying between hydrophobic and hydrophilic along the case interior wall between the battery case floor and the battery case ceiling to thereby facilitate self-propulsion of the liquid electrolyte in opposition to the force of gravity and a predetermined distribution of the liquid electrolyte along the case interior wall;

the pattern of surface tension has a wettability gradient progressing from hydrophobic to hydrophilic up the case interior wall to thereby transfer the liquid electrolyte from the battery case floor up the battery case interior wall in opposition to the force of gravity; and the wettability gradient is a function of a contact angle $\theta$ of the liquid electrolyte at an interface between the liquid electrolyte and the case interior wall, and wherein the contact angle $\theta$ includes a contact angle $\theta_B$ of the liquid electrolyte at a location proximate the battery case ceiling and a contact angle $\theta_A$ of the liquid electrolyte at a location proximate the battery case floor according to an expression $\theta_B = \theta_A - \int_0^H (d*dh)$, and wherein H is defined as a height of the case interior wall and d is defined as the wettability gradient.

* * * * *